(12) United States Patent  
Spatzier et al.

(10) Patent No.: US 10,805,228 B2  
(45) Date of Patent: *Oct. 13, 2020

(54) INJECTION OF INFORMATION TECHNOLOGY MANAGEMENT PROCESS INTO RESOURCE REQUEST FLOWS

(71) Applicant: International Business Machines Corporation, Armonk, NY (US)

(72) Inventors: Thomas Spatzier, Holzgerlingen (DE); Hendrik Wagner, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/261,897

(22) Filed: Jan. 30, 2019

(65) Prior Publication Data

US 2019/0166065 A1 May 30, 2019

Related U.S. Application Data

(63) Continuation of application No. 15/437,087, filed on Feb. 20, 2017, now Pat. No. 10,277,526.

(51) Int. Cl.
*H04L 12/911* (2013.01)
*H04L 29/08* (2006.01)
(Continued)

(52) U.S. Cl.
CPC .......... *H04L 47/72* (2013.01); *G06F 9/45558* (2013.01); *H04L 41/50* (2013.01);
(Continued)

(58) Field of Classification Search
CPC ......... H04L 63/10; H04L 67/10; H04L 67/32; H04L 67/1031; H04L 41/50; H04L 41/5041; H04L 47/72
(Continued)

(56) References Cited

U.S. PATENT DOCUMENTS 8,782,233 B2   7/2014  Ferris
8,875,149 B2 * 10/2014  Slater .................. G06F 9/52
                                                       718/103

(Continued)

OTHER PUBLICATIONS

Tsai, Wei-Tek et al., "Service-Oriented Cloud Computing Architecture", 2010 Seventh International Conference on Information Technology, IEEE, 2010, pp. 684-689.

(Continued)

*Primary Examiner* — Ruolei Zong
(74) *Attorney, Agent, or Firm* — William H. Hartwell; Madeline F. Schiesser; Keohane & D'Alessandro, PLLC

(57) ABSTRACT

A computer-implemented method for performing a cloud computing resource operation in a cloud computing environment is herein provided. The method comprises receiving a request to create a resource from the cloud computing environment using a user interface and intercepting the request of the creation of the resource. The method further comprises determining whether an IT management process needs to be triggered based on a policy rule. In case of a positive outcome of the determination, the method comprises requesting a reserved resource identifier from the cloud computing environment relating to the request, creating a temporary representation identifier of the cloud computing resource, triggering the IT management process, receiving a process identifier from the cloud computing environment for the requested resource, creating the requested resource in the cloud computing environment, and on completion of the creation process, removing the temporary representation identifier.

20 Claims, 10 Drawing Sheets

(51) Int. Cl.
*H04L 12/24* (2006.01)
*G06F 9/455* (2018.01)

(52) U.S. Cl.
CPC ...... *H04L 41/5051* (2013.01); *H04L 41/5096* (2013.01); *H04L 67/10* (2013.01); *G06F 2009/45579* (2013.01)

(58) Field of Classification Search
USPC .......................................................... 709/226
See application file for complete search history.

(56) References Cited

U.S. PATENT DOCUMENTS

| | | | |
|---|---|---|---|
| 8,904,483 B1* | 12/2014 | Martini | H04L 61/301 726/2 |
| 9,356,883 B1 | 5/2016 | Borthakur | |
| 9,397,884 B2 | 7/2016 | Chatterjee et al. | |
| 9,690,925 B1* | 6/2017 | Banerjee | G06F 21/44 |
| 2007/0055674 A1* | 3/2007 | Sunada | G06F 16/93 |
| 2014/0059542 A1* | 2/2014 | Ashok | G06F 9/5077 718/1 |
| 2014/0115168 A1* | 4/2014 | Yamashima | G06F 9/5077 709/226 |
| 2015/0067171 A1* | 3/2015 | Yum | G06F 9/5072 709/226 |
| 2016/0012251 A1* | 1/2016 | Singh | G06F 21/6254 707/783 |
| 2016/0127454 A1 | 5/2016 | Maheshwari et al. | |
| 2018/0241690 A1 | 8/2018 | Spatzier | |

OTHER PUBLICATIONS

Zong, Ruolei, U.S. Appl. No. 15/437,087, Notice of Allowance & Fees Due dated Dec. 13, 2018, 12 pgs.

* cited by examiner

INJECTION OF INFORMATION TECHNOLOGY MANAGEMENT PROCESS INTO RESOURCE REQUEST FLOWS

The present patent document is a continuation of U.S. patent application Ser. No. 15/437,087, filed Feb. 20, 2017, entitled "INJECTION OF INFORMATION TECHNOLOGY MANAGEMENT PROCESS INTO RESOURCE REQUEST FLOWS", the disclosure of which is incorporated herein by reference.

FIELD OF THE INVENTION

The present invention relates generally to a method for managing cloud computing resources, and more specifically, to a computer-implemented method for performing a cloud computing resource operation in a cloud computing environment. The present invention relates further to a system for performing a cloud computing resource operation in a cloud computing environment and to a related computer program product.

BACKGROUND

In enterprise IT (information technology) environments, two main technologies are used. Cloud technology is used to request and release standard resources like virtual servers, virtual storage, or other high-level services. At the same time, IT departments try to protect running systems by an IT management process (i.e., IT governance processes). The latter helps to reduce the risk of misconfigurations leading to outages, for example, by assessing the risk of changes and establishing an approval workflow. Combining these two technologies may lead to problems and conflicts in related objectives.

SUMMARY

A computer-implemented method for performing a cloud computing resource operation in a cloud computing environment is herein provided. The method comprises receiving a request to create a resource from the cloud computing environment using a user interface and intercepting the request of the creation of the resource. The method further comprises determining whether an IT management process needs to be triggered based on a policy rule. In case of a positive outcome of the determination, the method comprises requesting a reserved resource identifier from the cloud computing environment relating to the request, creating a temporary representation identifier of the cloud computing resource, triggering the IT management process, receiving a process identifier from the cloud computing environment for the requested resource, creating the requested resource in the cloud computing environment, and on completion of the creation process, removing the temporary representation identifier.

One aspect of the present invention includes a computer-implemented method for performing a cloud computing resource operation in a cloud computing environment, wherein the method comprises: receiving a request to create a resource in the cloud computing environment; intercepting the request between a user interface and the requested resource; determining whether to trigger an IT management process based on a policy rule; and responsive to a determination to trigger the IT management process: requesting, from the cloud computing environment, a reserved resource identifier relating to the request; creating a temporary representation identifier of the cloud computing resource; triggering the IT management process; receiving, from the cloud computing environment, a process identifier for the requested resource; creating the requested resource in the cloud computing environment; and removing the temporary representation identifier in response to completion of the creating.

Another aspect of the present invention includes a system for performing a cloud computing resource operation in a cloud computing environment, the computer system comprising: a memory medium comprising program instructions; a bus coupled to the memory medium; a processor, for executing the program instructions, the program instructions comprising: a user interface module adapted for receiving a request to create a resource in the cloud computing environment; an interceptor adapted for intercepting the request between a user interface and the requested resource; a determination unit adapted for determining whether to trigger an IT management process based on a policy rule; and wherein the interceptor is also adapted for, responsive to a determination to trigger the IT management process: requesting, from the cloud computing environment, a reserved resource identifier relating to the request; creating a temporary representation identifier of the cloud computing resource; triggering the IT management process; receiving, from the cloud computing environment, a process identifier for the requested resource; creating the requested resource in the cloud computing environment; and removing the temporary representation identifier in response to completion of the creating.

Yet another aspect of the present invention includes a computer program product for performing a cloud computing resource operation in a cloud computing environment, the computer program product comprising a computer readable hardware storage device having program instructions embodied therewith, the program instructions being executable by one or more computing systems to cause the one or more computing systems to: receive a request to create a resource in the cloud computing environment; intercept the request between a user interface and the requested resource; determine whether to trigger an IT management process based on a policy rule; and responsive to a determination to trigger the IT management process: request, from the cloud computing environment, a reserved resource identifier relating to the request; create a temporary representation identifier of the cloud computing resource; trigger the IT management process; receive, from the cloud computing environment, a process identifier for the requested resource; create the requested resource in the cloud computing environment; and remove the temporary representation identifier in response to completion of the creating.

BRIEF DESCRIPTION OF THE SEVERAL VIEWS OF THE DRAWINGS

It should be noted that embodiments of the invention are described with reference to different subject matters. In particular, some embodiments are described with reference to method-type claims, whereas other embodiments have been described with reference to apparatus-type claims. However, a person skilled in the art will gather from the above and the following description that, unless otherwise noted, in addition to any combination of features belonging to one type of subject matter, any combination between features relating to different subject matters, and, in particular, between features of the method-type claims and features of the apparatus-type claims, is considered as to be disclosed within this document.

The aspects defined above and further aspects of the present invention are apparent from the examples of embodiments to be described hereinafter and are explained with reference to the examples of embodiments, but to which the invention is not limited.

These and other features of this invention will be more readily understood from the following detailed description of the various aspects of the invention taken in conjunction with the following accompanying drawings.

Embodiments of the invention will be described, by way of example only, with reference to the following drawings.

Figure 1:
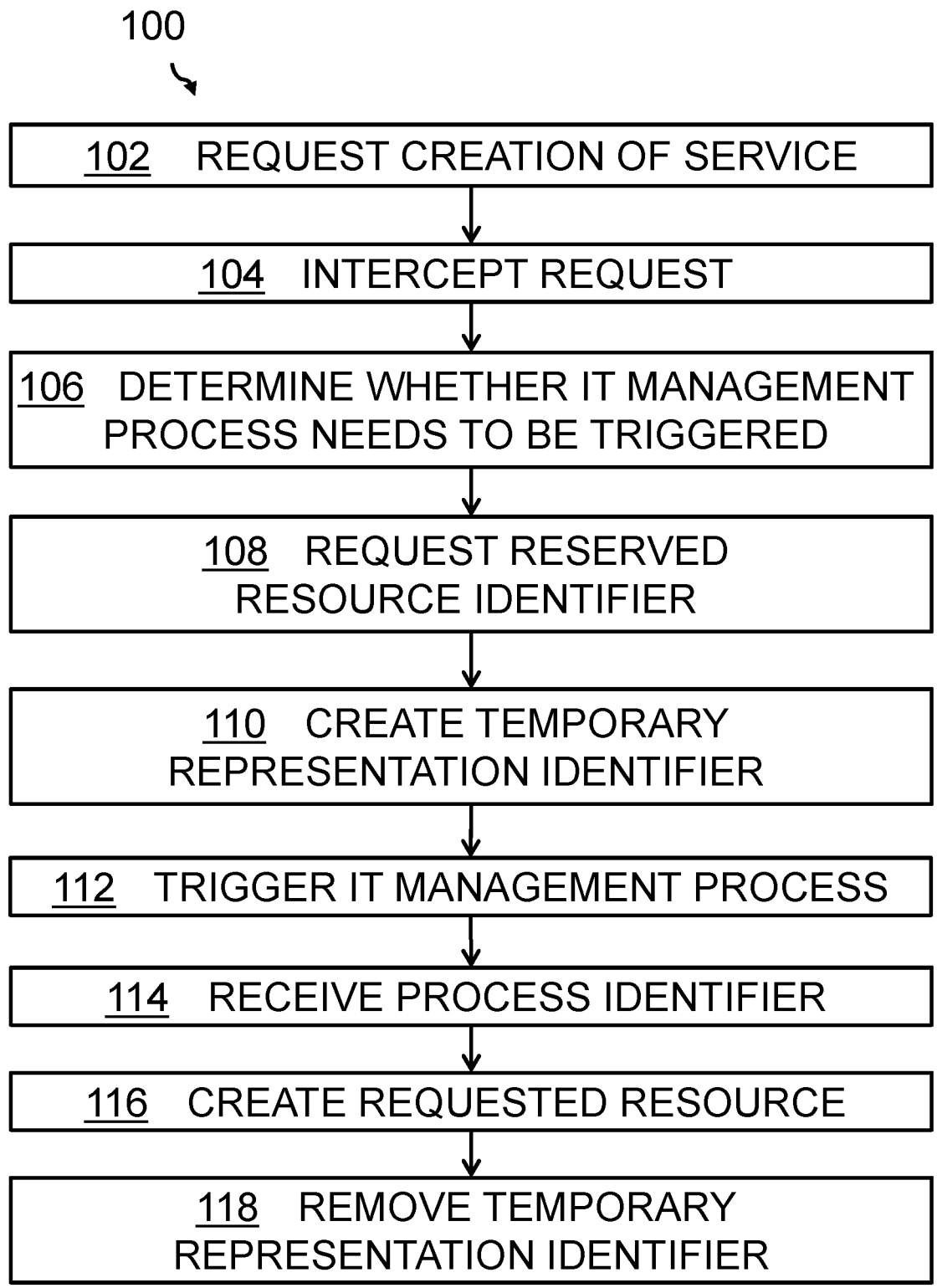

FIG. 1 shows a flowchart diagram of an embodiment of the inventive computer-implemented method for performing a cloud computing resource operation in a cloud computing environment according to illustrative embodiments of the present invention.

Figure 2:
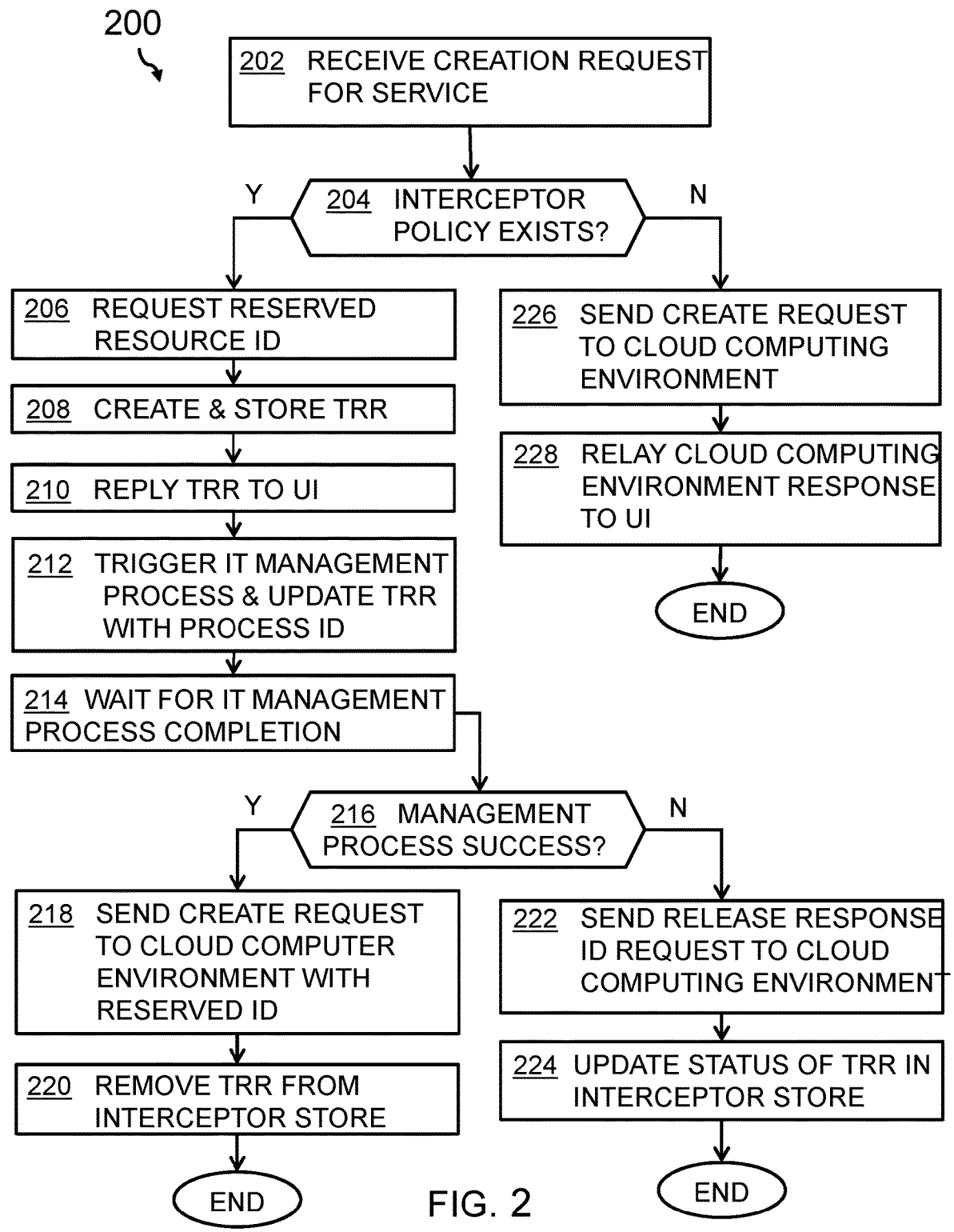

FIG. 2 shows a flowchart diagram of an embodiment for creating a resource or service according to illustrative embodiments of the present invention.

Figure 3:
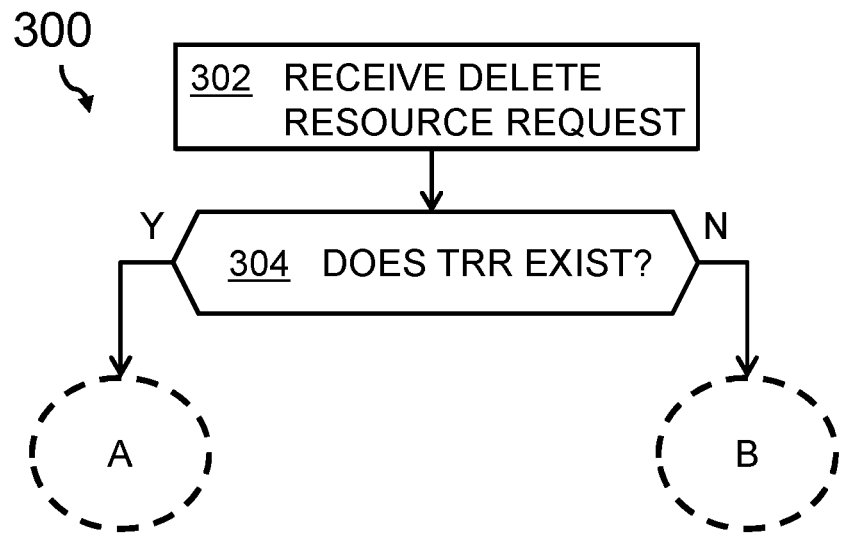

FIG. 3 shows a flowchart diagram of an embodiment for deleting a resource or service according to illustrative embodiments of the present invention.

Figure 4A:
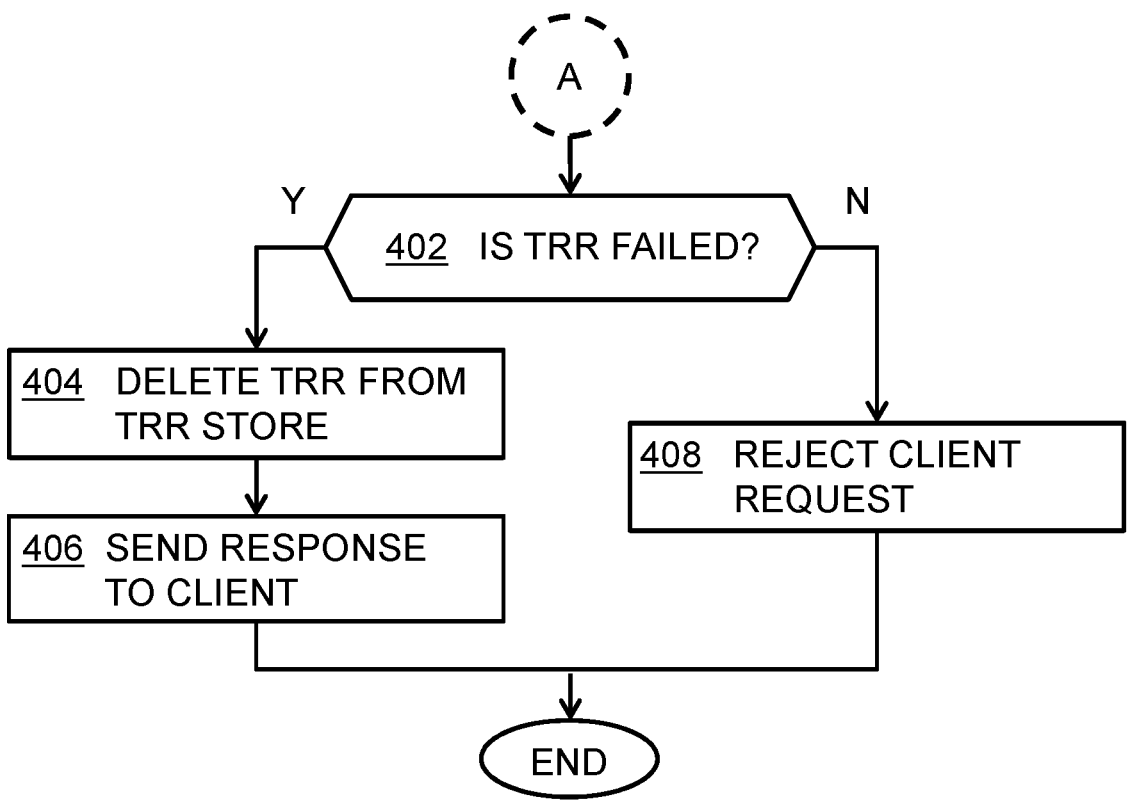
Figure 4B:
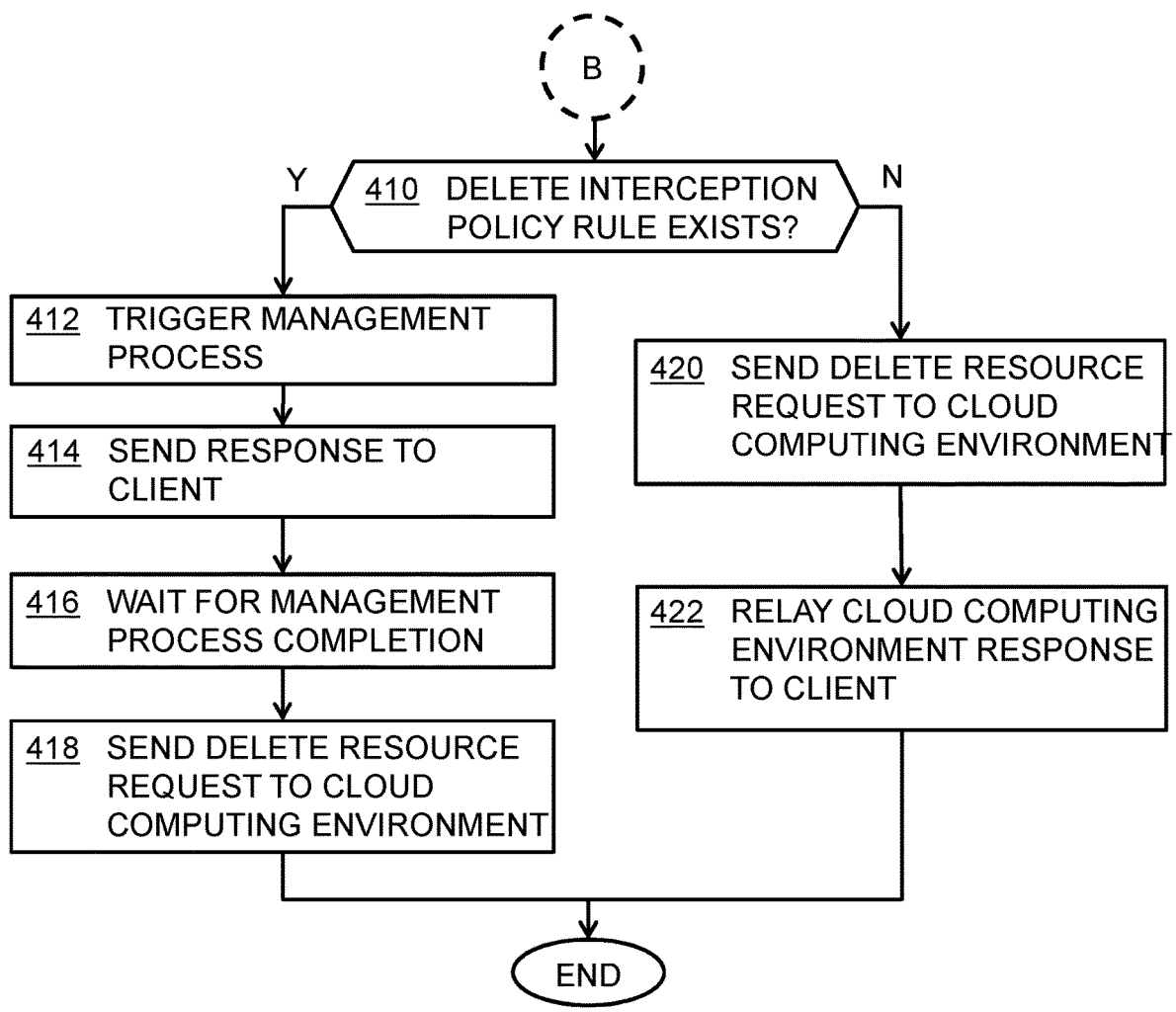

FIG. 4A and FIG. 4B show a more detailed level of the flowchart diagram of FIG. 3 according to illustrative embodiments of the present invention.

Figure 5:
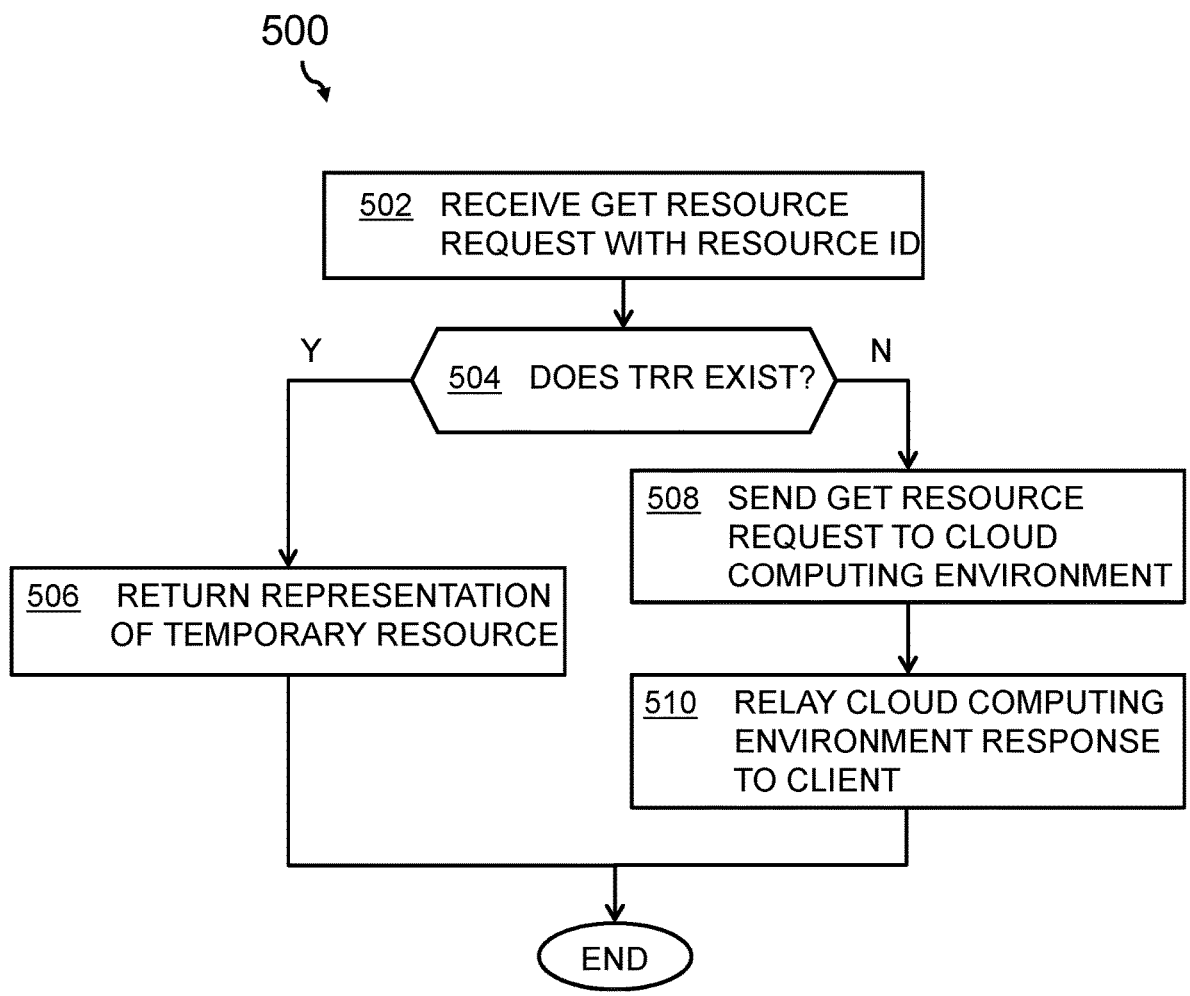

FIG. 5 shows a flowchart diagram of an embodiment for getting a resource by an ID according to illustrative embodiments of the present invention.

Figure 6:
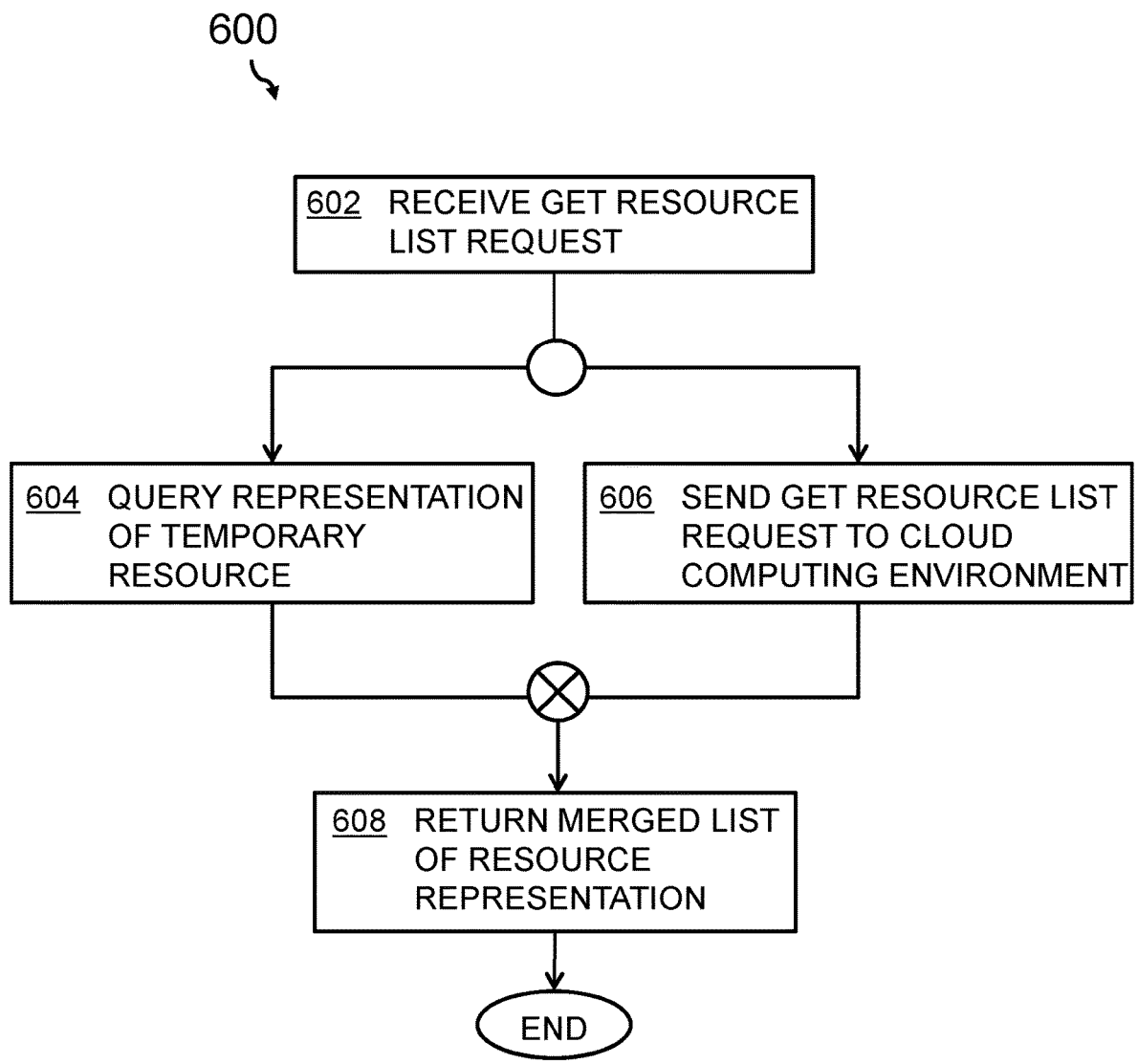

FIG. 6 shows a flowchart diagram of an embodiment for getting a resource list according to illustrative embodiments of the present invention.

Figure 7:
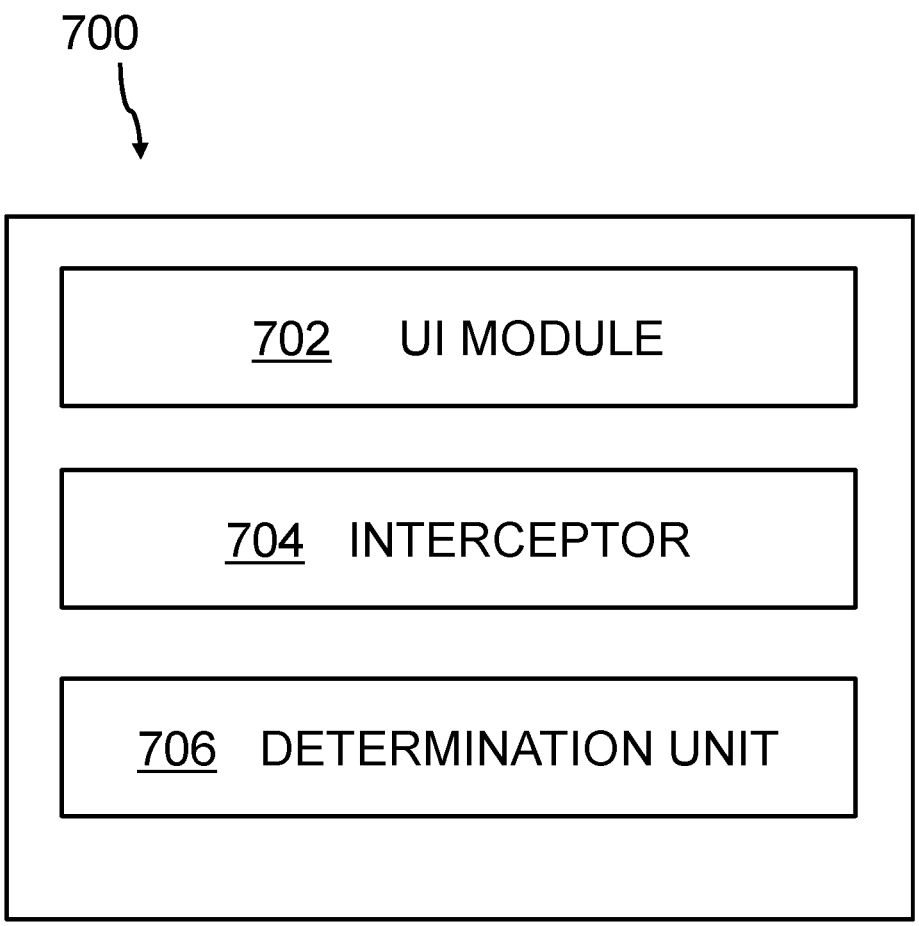

FIG. 7 shows a block diagram of an embodiment of the system for performing a cloud computing resource operation in a cloud computing environment according to illustrative embodiments of the present invention.

Figure 8:
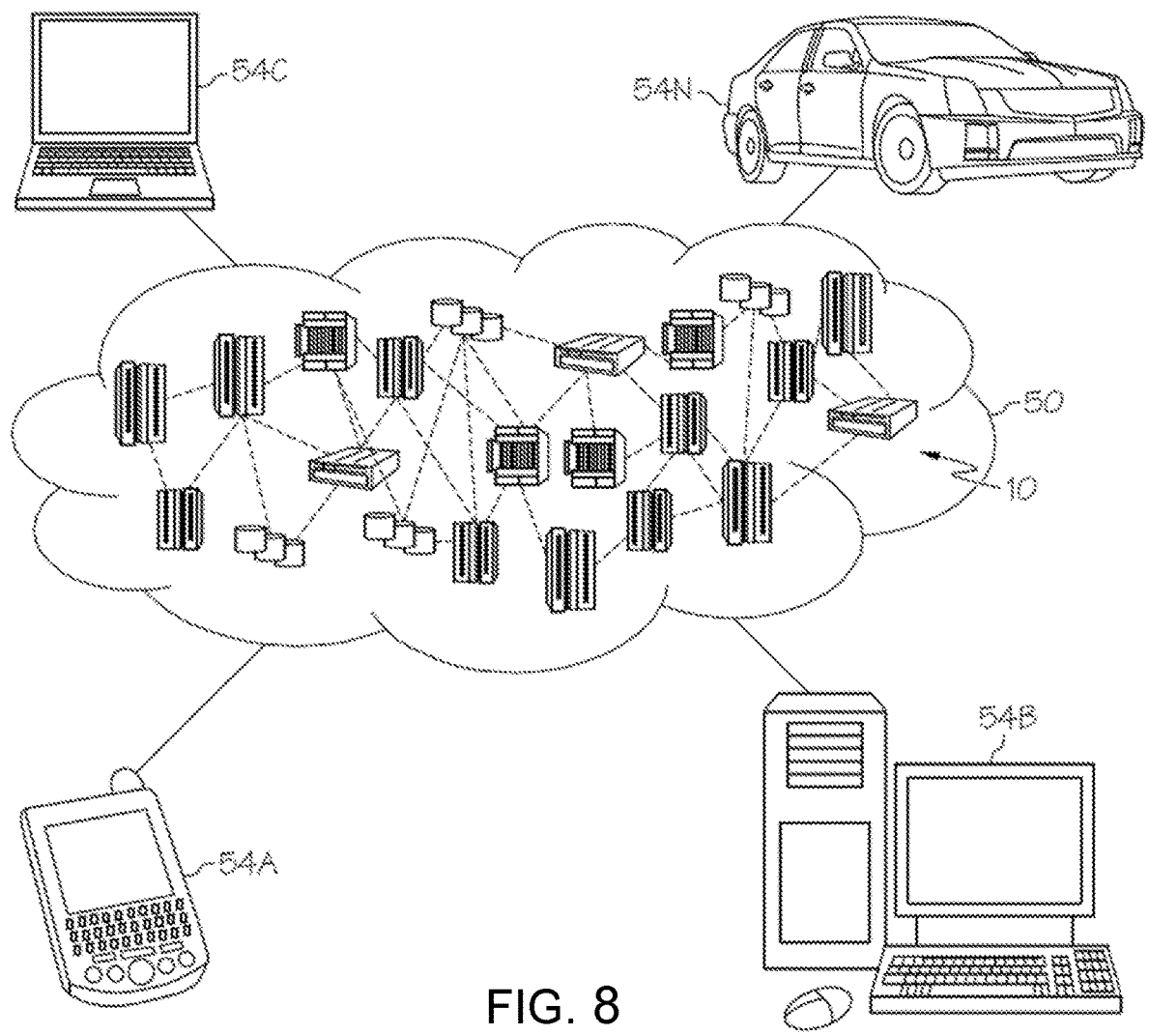

FIG. 8 shows a cloud computing environment according to illustrative embodiments of the present invention.

Figure 9:
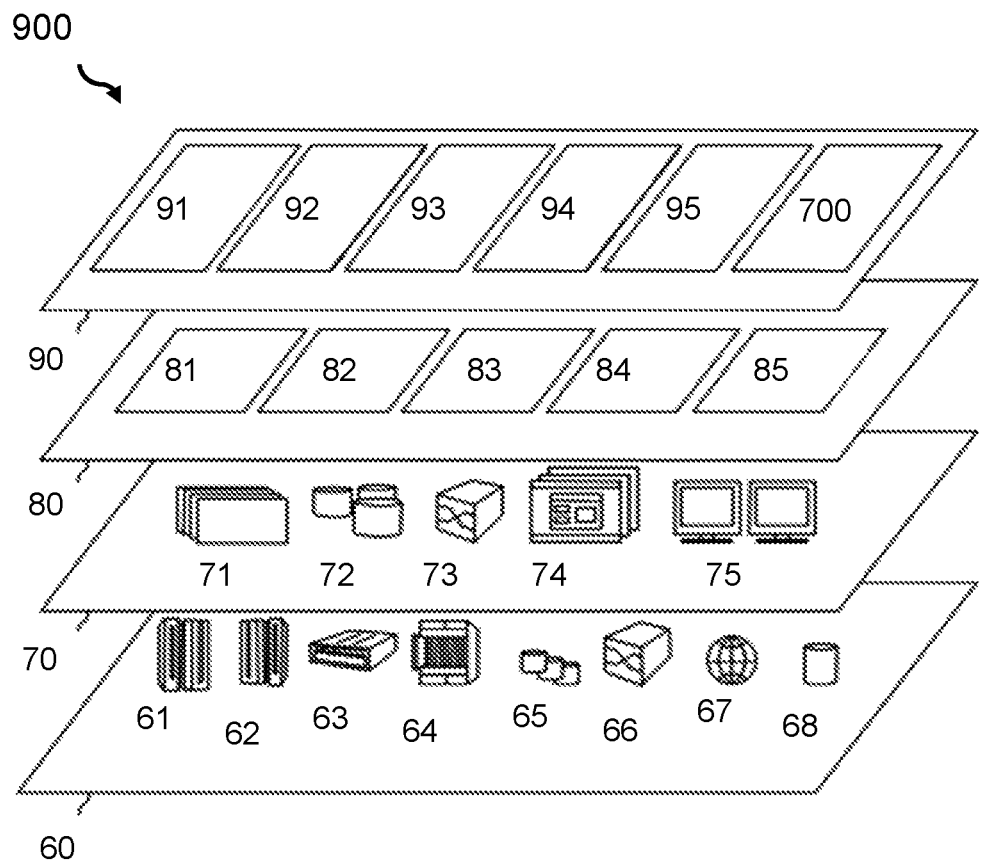

FIG. 9 shows functional abstraction layers according to illustrative embodiments of the present invention.

Figure 10:
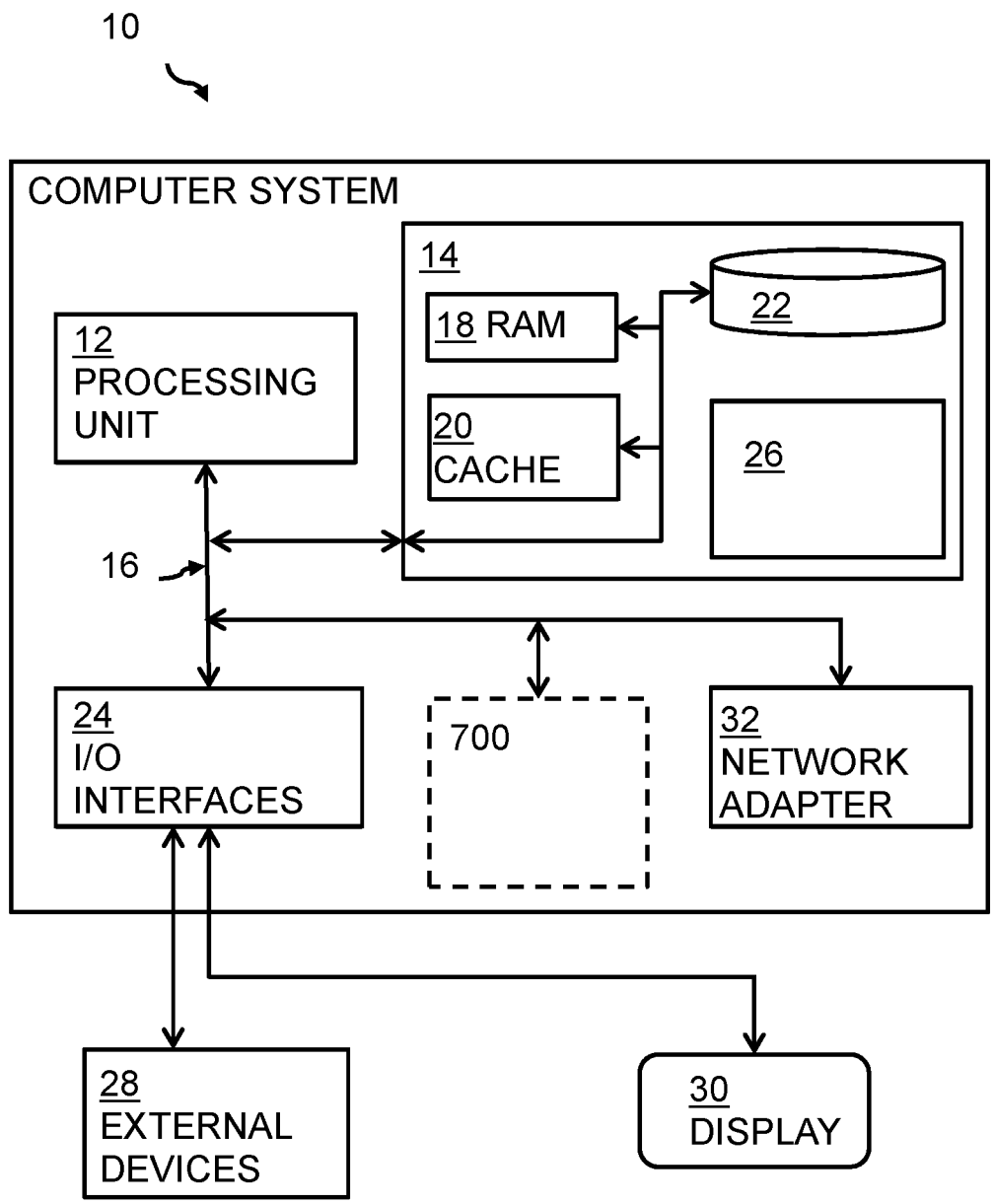

FIG. 10 shows a block diagram of a computing system according to illustrative embodiments of the present invention.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

In the context of this description, the following conventions, terms, and/or expressions may be used:

The term 'cloud computing resource operation' denotes an operation requested for a resource or a service in a cloud computing environment. Basic operations to such a resource may include a creation of the service/resource, a change request to the service/resource, or a delete request to the service/resource. It should also be noted that, in the context of this document, a typical cloud computing resource may be a service.

The term 'user interface' (or UI) denotes a component of a human-machine interaction. The goal of such an interaction is to allow effective operation and control of the machine/computer from the human end while the machine simultaneously feeds back information that aids the operators' decision-making process. In the context of this document, the user interface is typically a web user interface (web UI).

The term 'service' or 'cloud service' denotes a way of usage of the cloud computing environment. Everything from such a cloud computing environment may be provided as a service: computing power, network resources, storage capacities, and/or web-based applications.

The term 'IT management process' denotes a set of actions governed by one or more rules in order to control and manage an information technology environment comprising a plurality of computers, networks, storage devices, and/or applications. In some cases, a set of rules for an IT management process may also be denoted as an architecture governance framework. In any case, to be provisioned, cloud services have to undergo an architecture compliance framework check to determine whether they may be useable in a specific enterprise IT environment.

The term 'temporary representation identifier' or TRI denotes an identifier for a resource or service in the cloud computing environment which is only to be assigned temporarily. In the context of this document, the temporary character of the representation identifier can be linked to an existence of a simulated resource or service of the cloud computing environment. The simulation on the resource or service, and thus the TRI, can be performed by an interceptor.

The term 'interceptor' denotes a function for intervening an application programming interface (API) call. The API call from a requester to a service can be interrupted or intercepted by the interceptor. The interceptor itself can modify or replace the original API call.

The term 'RESTful' is an acronym for representational state transfer (REST) or RESTful web services, which is one way of providing interoperability between computer systems on the Internet. REST-compliant web services allow requesting systems to access and manipulate textual representations of web resources using a uniform and predefined set of stateless operations. Other forms of web services exist, which expose their own arbitrary sets of operations such as WSDL (web service definition language) and SOAP (Simple Object Access Protocol). In a REST web service, requests made to a resource's URI will elicit a response that may be in XML (eXtended Markup Language), HTML (HyperText Markup Language), JSON (JavaScript Object Notation) or some other defined format. The response can confirm that some alteration has been made to the stored resource, and can provide hypertext links to other related resources or collections of resources. Using HTTP, as is most common, the kind of operations available include those predefined by the HTTP verbs GET, POST, PUT, DELETE, and so on. By making use of a stateless protocol and standard operations, REST systems aim for fast performance, reliability, and the ability to grow, by using reused components that can be managed and updated without affecting the system as a whole, even while the system is running.

It should be noted that a device of a user may access the (e.g., physical) resource which may be a service in a cloud computing environment.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

The term 'cloud computing' may in this context be interpreted as a model for enabling convenient, on-demand network access to a shared pool of configurable computing resources (e.g., networks, network bandwidth, servers, processing, memory, storage, applications, virtual machines, and services) that can be rapidly provisioned and released with minimal management effort or service provider interaction. This cloud model promotes availability and may include at least five characteristics, three service models, and four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

It should be noted that cloud software takes full advantage of the cloud paradigm by being service-oriented with a focus on statelessness, low coupling, modularity, and semantic interoperability.

The computer-implemented method for performing a cloud computing resource operation in a cloud computing environment according to embodiments of the present invention offers multiple advantages and technical effects.

In enterprise IT, management processes such as ITIL (information technology infrastructure library) based processes govern the use of changes to the IT environment. This includes resources located in a cloud computing environment or, in short, in the cloud. One example for a management process is getting an approval for a request for new cloud computing resources. Cloud computing resources can be, but are not limited to: virtual machines, storage volumes, network resources, or cloud-based applications. Cloud computing environments are designed for provisioning and managing cloud resources. An example of cloud computing environments is OpenStack. Such cloud computing environments can provide out-of-the-box (OOTB) cloud web user interfaces (UIs) that are unaware of any company specific IT management processes. Therefore, an IT management resource operation of a specific cloud computing environment may not be reflected in a UI of a related standard IT management tool. Therefore, the IT management process governed cloud user cannot use the out-of-the-box cloud web UI since the usage would bypass the required IT management process (i.e., the governance rules). An example for an out-of-the-box cloud web UI is Horizon for OpenStack.

Thus, a façade UI needs to be built that implements the IT management process-aware invocation logic and replicates most of the out-of-the-box cloud web UI's functionality. It may invoke the IT management process, as well as the cloud computing environment, via a REST API. Alternatively, invoking the IT management process may be done via a non-REST based API. Having the extra façade UI may require additional user training instead of using the industry-wide known cloud web UIs. For each extension of the cloud computing environment (i.e., each new service, new version), the out-of-the-box cloud web UI ships with a respective extended UI functionality. The extended capabilities of the out-of-the-box cloud web UI can again not be used in the enterprise governed by the IT management process, because of the missing reflected IT management process. Therefore, the extensions have to be (re-) implemented in the façade UI. This may result in a high maintenance effort for the far side user interface.

The requirement for continuously adapting façade UIs for new versions of out-of-the-box cloud web UIs for enhanced capabilities of a cloud computing environment may no longer be required. In embodiments of the present invention, the interceptor can control the communication from the out-of-the-box cloud web UI to the resources/services of the cloud computing environment. If the interceptor determines that an IT management process (i.e., a governance process according to a governance rule) may be required in order to perform an IT management resource operation (e.g., like create, modify, delete a resource or service) the interceptor can initially provide representation of a temporary form of the resource. Thus, the resource or service, or, better yet, the existence of the resource or service, can be simulated to the out-of-the-box cloud web UIs until the IT management process has been completed. If it is confirmed that the rule(s) according to the governance process is/are met, the interceptor connects directly to the cloud computing environment in order to relay the original request from the out-of-the-box cloud web UI.

Hence, new native out-of-the-box cloud web UI may be used and operated together with the related cloud computing environment. One difference is that the out-of-the-box cloud web UI does not forward a respective request from the user interface to the cloud computing environment directly. Instead, the interceptor controls which requests are to be forwarded directly to the cloud computing environment and which requests are to be held back until the IT management process (i.e., the check against the governance rules) has been completed without any problems.

As a result, no façade UI has to be built and maintained on a continuous basis. Instead, standard components of a cloud computing environment can be used although specific enterprise IT governance rules have to be reflected.

In an additional embodiment of the method, the cloud computing resource operation can be selected from the group comprising creating a resource, changing a resource, and deleting a resource. With these options, typical operations in cloud computing environments are addressed. A person skilled in the art would understand that in cloud computing environments, a resource may typically be implemented or provisioned as a service, and, as such, that process will not be discussed in detail herein in the interest of brevity.

According to one advantageous embodiment of the method, a resource is selected from the group comprising computing capacities, storage capacities, network capacities, and a software application. Thus, all typical resources (e.g., services) in a cloud computing environment are addressed. Methods of embodiments of the present invention do not exclude any specific resources.

According to a further advantageous embodiment of the method, the creation of the temporary representation identifier (TRI) can comprise storing the TRI and the related reserved resource identifier in a temporary resource representation storage or store (TRR store). Thus, the TRI is stored in an environment exclusively controlled by the interceptor and independent from the production cloud computing environment.

An enhanced embodiment of the method comprises requesting a delete request regarding the service from the cloud computing environment using the user interface; intercepting the delete request, in particular by the interceptor component, between the user interface and the cloud computing environment; and determining, in particular by a specific interceptor component, whether an IT management process needs to be triggered based on a policy rule. In the case of a positive outcome of the determination, the method further comprises triggering the related IT management process. On completion of the related IT management process, the method can comprise sending a delete resource request to the cloud computing environment and optionally informing the UI. As a consequence, not only is a creation of a resource supported by the novel method, but also a deletion of a resource or service.

According to another embodiment of the method, on a negative outcome of the determination whether the IT management process needs to be triggered, the method can comprise creating the requested service in the cloud computing environment directly. Thus, the requested service/resource can be created (or deleted or modified) directly, without the need for the IT management process (e.g., if only small changes are to be made).

According to a further embodiment of the method, the method can also comprise requesting a list of available services (e.g., in particular resources) by the user interface. In case a TRI exists, the method comprises returning the TRI to the user interface, forwarding the request of the list to the cloud computing environment, and relaying a response related to the request of the list from the cloud computing environment to the user interface. Thus, although the interceptor can control the communication between the UI and the cloud computing environment, a complete list of available resources can be generated at any time.

According to one another embodiment of the method, the policy rule is stored in an interceptor policy repository. This allows an operation of the interceptor more or less independent of the cloud computing environment and the out-of-the-box cloud web UI. It should also be understood that a single IT governance process may be implemented by a plurality of rules.

According to one advantageous embodiment of the method, the interception can be performed by an interceptor module, wherein a communication between the user interface and the interceptor, as well as a communication between the interceptor and the cloud computing environment, can be based on a RESTful (Representational State transfer) interface. Thus, the interceptor can behave like the web cloud UI, so that the cloud computing environment may not be aware from which component (i.e., the cloud web UI or the interceptor) a specific request is coming.

In the following, a detailed description of the Figures will be given. All instructions in the Figures are schematic. Firstly, a flowchart diagram of an embodiment of the inventive computer-implemented method for performing a cloud computing resource operation in a cloud computing environment is given. Afterwards, further embodiments, as well as embodiments of the system for performing a cloud computing resource operation in a cloud computing environment, will be described.

FIG. 1 shows a flowchart diagram of an embodiment of the computer-implemented method for performing a cloud computing resource operation. Typical cloud computing operations include "create", "delete", and "change" (or modify) a resource in a cloud computing environment. In the context of the present invention, the resource is typically a compute, storage, network, and/or application service. Method 100 for performing a cloud computing resource operation comprises, requesting, at 102, a creation of a service from the cloud computing environment using a user interface (e.g., a web UI) and intercepting (e.g., by an interceptor), at 104, the request of the creation of the service between the user interface and the requested service (i.e. from the cloud computing environment).

The method 100 comprises further determining (e.g., by an interceptor component), at 106, whether an IT management process (in particular an IT governance process) needs to be triggered based on a policy rule. In case of a positive outcome of the determination, the method 100 comprises requesting, at 108, a reserved resource identifier from the cloud computing environment relating to the request; creating, at 110, a TRI of the cloud computing resource; and, in particular by delivering the TRI to the UI, triggering, at 112, the IT management process; receiving, at 114, a process identifier from the cloud computing environment for the requested service; and creating, at 116, the requested resource in the cloud computing environment.

On completion of the creation process, the method comprises removing, at 118, the TRI. Optionally, the TRI can be replaced by a real process ID of the cloud computing environment. Thus, the herein newly described method of embodiments of the present invention covers a process of creating a cloud computing environment resource (i.e., a cloud service using a standard web UI for managing cloud computing services from a cloud computing environment) while, at the same time, enabling individual enterprise-specific IT management processes (i.e., supervising governance rules and frameworks). This combines the advantage of standard cloud computing management tools with the individuality of enterprise-specific functionalities. It should be understood that, while the above example depicts a resource in the cloud computing environment, the above method can also implement a service.

FIG. 2 shows a flowchart diagram 200 of an embodiment for creating a resource or service when a request for creating the resource or service is received, at 202, by the interceptor, also denoted as resource requests interceptor, from the out-of-the-box (OOTB) cloud web UI. Then, resource requests interceptor checks, at 204, whether the created resource request is flagged for interception in the interceptor policy store (not explicitly shown).

If the request needs to be intercepted, the interceptor requests, at 206, a reserved identifier (ID) from the cloud computing environment. The interceptor creates, at 208, a temporary resource representation (TRR) from the reserved ID and stores the TRR in the interceptor TRR store (not explicitly shown). The response including the TRR is sent back, at 210, to the OOTB cloud web UI. As a next step, the IT management process is invoked, at 212. This could be implemented by a REST API or any other local or remote programming language API. The process ID returned by the IT management process invocation is stored together with a TRR.

The interceptor then waits, at 214, for the completion of the IT management process identified by the process ID. If the IT management process is completed successfully, at 216, the interceptor invokes, at 218, the cloud computing environment (e.g., via the REST API) to create the requested resource. The request contains the reserved ID obtained from the TRR in the interceptor TRR store. Once the cloud computing environment responds to the created resource request, the TRR is removed, at 220, from the interceptor TRR store.

If the IT management process is completed with an error, at 222, the interceptor invokes the cloud computing environment (e.g., via the REST API) to release the reserved ID, at 222. The status of the TRR in the interceptor's TRR store is marked as failed, at 224. In both cases, whether the management process outcome is successful or unsuccessful, the process ends, after the update of the interceptor store.

In the case that the root request for creating the resource received by the interceptor from the OOTB cloud web UI is not flagged as to be intercepted, the interceptor invokes, at 226, the cloud computing environment directly and sends the create request to the cloud computing environment. This passes the response back to the OOTB cloud web UI without any further action, allowing, at 228, the cloud computing environment response to be relay to the UI. Then the process ends.

FIG. 3 shows a flowchart diagram 300 of an embodiment for deleting a resource or service. When a request for deleting a resource is received, at 302, by the interceptor from the OOTB cloud web UI, the interceptor checks, at 304, whether the TRR exists in the interceptor's TRR store. In the case that the TRR exists in the interceptor's TRR store, the process continues to branch "A," detailed in FIG. 4A. In the case that the TRR does not exist in the interceptor's TRR store, the process continues to branch "B," detailed in FIG. 4B.

FIG. 4A and FIG. 4B show a more detailed level of the flowchart diagram of FIG. 3. Referring now to FIG. 4A, if the TRR exists in the interceptor's TRR store, the status of the TRR is checked, at 402. If the status is marked as "failed," the TRR is removed, at 404, from the interceptor's TRR store and an HTTP OK response is sent back, at 406, to the OOTB cloud web UI. If the status value of the TRR is "not failed," then an IT management process is in progress and therefore the delete resource request is rejected, at 408.

Referring now to FIG. 4B, if the request for deleting a resource is received by the interceptor from the OOTB cloud web UI and the TRR does not exist in the interceptor's TRR store, then the interceptor checks whether the delete resource request is flagged for interception by the interceptor policy store, at 410. If the request is to be intercepted, the interceptor invokes or triggers an appropriate IT management process, at 412; sends, at 414, an HTTP OK response back to the OOTB cloud web UI; and waits, at 416, for the IT management process to complete. Once the IT management process is completed, the interceptor sends, at 418, the delete resource request to the cloud computing environment.

In the case that the request for deleting a resource received by the interceptor from the OOTB cloud web UI is not flagged for interception by the interceptor policy store, then the interceptor invokes, at 420, the cloud computing environment directly to send a delete resource request, and passes, at 422, the response from the cloud computing environment back to the OOTB cloud web UI without any further action.

FIG. 5 shows a flowchart diagram 500 of an embodiment for getting a resource by using a resource ID. When a request for getting a resource for a specific ID is received, at 502, by the interceptor from the OOTB cloud web UI, the interceptor checks, at 504, if the TRR with the specified ID exists in the interceptor TRR store. If the TRR exists, then the TRR is returned, at 506, to the OOTB cloud web UI, before the process ends.

If no TRR with the specified ID can be found in the interceptor TRR store, then the interceptor invokes, at 508, the cloud computing environment directly to send the get resource request to the cloud computing environment and passes or relays the response back, at 510, to the OOTB cloud web UI without any further action.

FIG. 6 shows a flowchart diagram 600 of an embodiment for getting a resource list. When a request for getting a resource list is received, 602, by the interceptor from the OOTB cloud web UI, the interceptor can perform two actions: (1) query, at 604, the TRR from the interceptor TRR store, and (2) query, at 606, the cloud resources from the cloud computing environment by forwarding the request to the cloud computing environment. These actions can be implemented in parallel across sequentially. Both results can be kept temporary. After the actions at 604 and 606 are completed, the interceptor merges, at 608, the results of the two queries and returns the resulting list back to the OOTB cloud web UI.

FIG. 7 shows a block diagram of an embodiment of the system 700 for performing a cloud computing resource operation in a cloud computing environment. The system comprises user interface (UI) module 702, adapted for requesting a creation of a resource or service from the cloud computing environment using a user interface. The system also comprises interceptor 704, adapted for intercepting the request of the creation of the resource or service between the user interface and the requested resource or service. The system further comprises determination unit 706, adapted for determining whether an IT management process needs to be triggered based on a policy rule. As already discussed above, the interceptor 704 is also adapted, in case of a positive outcome of the determination, for requesting a reserved resource identifier from the cloud computing environment relating to the request, creating a TRI of the cloud computing resource or service, triggering the IT management process, receiving a process identifier from the cloud computing environment for the requested resource or service, creating the requested resource or service in the cloud computing environment, and on completion of the creation process, removing the TRI.

Referring now to FIG. 8, illustrative cloud computing environment 850 is depicted. Cloud computing environment 850 includes one or more cloud computing nodes or computer systems 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

FIG. 9 shows a cloud computing environment 900 with functional abstraction layers in which embodiments of the present invention may be deployed. It should be understood in advance that the components, layers, and functions shown in FIG. 9 are intended to be illustrative only and embodiments of the invention are not limited thereto. As depicted, the following layers and corresponding functions are provided.

Hardware and software layers 60 include hardware and software components. Examples of hardware components include: mainframes 61; servers 63; RISC (Reduced Instruction Set Computer) architecture-based servers 62; blade servers 64; storage devices 65; networks and networking components 66. In some embodiments, software components include network application server software 67 and/or database software 68.

A virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment, and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workload layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and the system 700 for performing a cloud computing resource operation in a cloud computing environment.

Embodiments of the invention may be implemented together with virtually any type of computer, regardless of the platform being suitable for storing and/or executing program code. FIG. 10 shows, as an example, a computing system 10 suitable for executing program code related to embodiments of the present invention. It may be noted, that the described system for performing a cloud computing resource operation in a cloud computing environment as well as elements of the cloud computing environment may be implemented—at least partially—in form of the computing system 10.

The computing system 10 is only one example of a suitable computer system and is not intended to suggest any limitation as to the scope of use or functionality of embodiments of the invention described herein. Regardless, computer system 10 is capable of being implemented and/or performing any of the functionality set forth hereinabove. In the computer system 10, there are components, which are operational with numerous other general purpose or special purpose computing system environments or configurations. Examples of well-known computing systems, environments, and/or configurations that may be suitable for use with computer system/server 10 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 10 may be described in the general context of computer system-executable instructions, such as program modules, being executed by a computer system 10. Generally, program modules may include routines, programs, objects, components, logic, data structures, and so on that perform particular tasks or implement particular abstract data types. Computer system/server 10 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 10 is shown in the form of a general-purpose computing device. The components of computer system/server 10 may include, but are not limited to, one or more processors or processing units 12, a system memory 14, and a bus 16 that couples various system components including system memory 14 to the processor 12. Bus 16 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 10 typically includes a variety of computer system readable media. Such media may be any available media that is accessible by computer system/server 10, and it includes both, volatile and non-volatile media, removable and non-removable media.

The system memory 14 may include computer system readable media in the form of volatile memory, such as random access memory (RAM) 18 and/or cache memory 20. Computer system/server 10 may further include other removable/non-removable, volatile/non-volatile computer system storage media. By way of example only, storage system 22 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 16 by one or more data media interfaces. As will be further depicted and described below, memory 14 may include at least one program product having a set (e.g., at least one) of program modules that are configured to carry out the functions of embodiments of the invention.

The program/utility, having a set (at least one) of program modules 26, may be stored in memory 14 by way of example, and not limitation, as well as an operating system, one or more application programs, other program modules, and program data. Each of the operating system, one or more application programs, other program modules, and program data, or some combination thereof, may include an implementation of a networking environment. Program modules 26 generally carry out the functions and/or methodologies of embodiments of the invention as described herein.

The computer system/server 10 may also communicate with one or more external devices 28 such as a keyboard, a pointing device, a display 30, etc.; one or more devices that enable a user to interact with computer system/server 10; and/or any devices (e.g., network card, modem, etc.) that enable computer system/server 10 to communicate with one or more other computing devices. Such communication can occur via Input/Output (I/O) interfaces 24. Still yet, computer system/server 10 may communicate with one or more networks such as a local area network (LAN), a general wide area network (WAN), and/or a public network (e.g., the Internet) via network adapter 32. As depicted, network adapter 32 may communicate with the other components of computer system/server 10 via bus 16. It should be understood that although not shown, other hardware and/or software components could be used in conjunction with computer system/server 10. Examples include, but are not limited to: microcode, device drivers, redundant processing units, external disk drive arrays, RAID systems, tape drives, and data archival storage systems, etc.

Additionally, the system 700 for performing a cloud computing resource operation in a cloud computing environment may be attached to bus 16.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product at any possible technical detail level of integration. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), DVD and Blu-Ray-Disk.

The computer readable storage medium can further be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or another device to cause a series of operational steps to be performed on the computer, other programmable apparatus or other device to produce a computer implemented process, such that the instructions which execute on the computer, other programmable apparatus, or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart and/or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer-implemented method for performing a cloud computing resource operation in a cloud computing environment, wherein the method comprises:
   requesting, from the cloud computing environment, a reserved resource identifier relating to a request to create a resource in the cloud computing environment;
   creating a temporary representation identifier of the cloud computing resource;
   triggering an IT management process;
   creating the requested resource in the cloud computing environment, the requested resource having a process identifier obtained from the cloud computing environment; and
   removing the temporary representation identifier in response to completion of the creating.

2. The method according to claim 1, wherein the cloud computing resource operation is selected from the group consisting of: creating a resource, changing a resource, and deleting a resource.

3. The method according to claim 1, wherein the resource is selected from the group consisting of: computing capacities, storage capacities, network capacities, and a software application.

4. The method according to claim 1, wherein the creation of the temporary representation identifier comprises storing the temporary representation identifier and the reserved resource identifier in a temporary resource representation storage.

5. The method according to claim 1, the method further comprising:
   responsive a delete request to delete a resource from the cloud computing environment, triggering an IT management process responsive to the delete request; and
   sending a delete resource request to the cloud computing environment in response to completion of the IT management process responsive to the delete request.

6. The method according to claim 1, the method further comprising:
   returning, responsive to a request for a list of available resources, any existing temporary representation identifier to a user interface;
   forwarding the list request to the cloud computing environment; and
   relaying, to the user interface, a response to the list request from the cloud computing environment.

7. The method according to claim 1, wherein the IT management process is triggered based on a policy rule stored in an interceptor policy repository.

8. A system for performing a cloud computing resource operation in a cloud computing environment, the computer system comprising:
   a memory medium comprising program instructions;
   a bus coupled to the memory medium;
   a processor, for executing the program instructions, that when executing the program instructions causes the system to:
      request, from the cloud computing environment, a reserved resource identifier relating to a request to create a resource in the cloud computing environment;
      create a temporary representation identifier of the cloud computing resource;
      trigger an IT management process;
      create the requested resource in the cloud computing environment, the requested resource having a process identifier obtained from the cloud computing environment; and
      remove the temporary representation identifier in response to completion of the creating.

9. The computer system of claim 8, wherein the cloud computing resource operation is selected from the group consisting of: creating a resource, changing a resource, and deleting a resource.

10. The computer system of claim 8, wherein the resource is selected from the group consisting of: computing capacities, storage capacities, network capacities, and a software application.

11. The computer system of claim 8, the instructions further causing the system to store the temporary representation identifier and the reserved resource identifier in a temporary resource representation storage.

12. The computer system of claim 8, the instructions further causing the system to:
   responsive a delete request to delete a resource from the cloud computing environment, trigger an IT management process responsive to the delete request; and
   send a delete resource request to the cloud computing environment in response to completion of the IT management process responsive to the delete request.

13. The computer system of claim 8, the instructions further causing the system to:
   return, responsive to a request for a list of available resources, any existing temporary representation identifier to a user interface;
   forward the list request to the cloud computing environment; and
   relay, to the user interface, a response to the list request from the cloud computing environment.

14. The computer system of claim 8, wherein the IT management process is triggered based on a policy rule stored in an interceptor policy repository.

15. A computer program product for performing a cloud computing resource operation in a cloud computing environment, the computer program product comprising a computer readable hardware storage device, and program instructions stored on the computer readable hardware storage device, to:
   request, from the cloud computing environment, a reserved resource identifier relating to a request to create a resource in the cloud computing environment;
   create a temporary representation identifier of the cloud computing resource;
   trigger an IT management process;
   create the requested resource in the cloud computing environment, the requested resource having a process identifier obtained from the cloud computing environment; and
   remove the temporary representation identifier in response to completion of the creating.

16. The computer program product of claim 15, wherein the cloud computing resource operation is selected from the group consisting of: creating a resource, changing a resource, and deleting a resource.

17. The computer program product of claim 15, wherein the resource is selected from the group consisting of: computing capacities, storage capacities, network capacities, and a software application.

18. The computer program product of claim 15, the computer readable storage device further comprising instructions to store the temporary representation identifier and the reserved resource identifier in a temporary resource representation storage.

19. The computer program product of claim 15, the computer readable storage device further comprising instructions to:
- responsive a delete request to delete a resource from the cloud computing environment, trigger an IT management process responsive to the delete request; and
- send a delete resource request to the cloud computing environment in response to completion of the IT management process responsive to the delete request.

20. The computer program product of claim 15, the computer readable storage device further comprising instructions to:
- return, responsive to a request for a list of available resources, any existing temporary representation identifier to a user interface;
- forward the list request to the cloud computing environment; and
- relay, to the user interface, a response to the list request from the cloud computing environment.

* * * * *